United States Patent
Hopewell

(10) Patent No.: US 7,199,482 B2
(45) Date of Patent: Apr. 3, 2007

(54) SYSTEM AND METHOD FOR CONTROLLING EFFECTIVE WIND FARM POWER OUTPUT

(75) Inventor: Paul David Hopewell, Staffordshire (GB)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/172,769

(22) Filed: Jun. 30, 2005

(65) Prior Publication Data

US 2007/0001461 A1    Jan. 4, 2007

(51) Int. Cl.
*H02J 5/00* (2006.01)

(52) U.S. Cl. ........................................... 290/44; 307/11
(58) Field of Classification Search .................. None
See application file for complete search history.

(56) References Cited

U.S. PATENT DOCUMENTS

| | | | | |
|---|---|---|---|---|
| 4,228,362 A | * | 10/1980 | Jacobs et al. | 290/44 |
| 4,388,533 A | * | 6/1983 | Campbell et al. | 290/1 R |
| 4,418,287 A | * | 11/1983 | Syverson | 290/44 |
| 4,841,731 A | * | 6/1989 | Tindell | 60/641.8 |
| 5,592,028 A | * | 1/1997 | Pritchard | 290/55 |
| 5,745,105 A | * | 4/1998 | Kim | 345/212 |
| 5,900,330 A | * | 5/1999 | Kagatani | 429/17 |
| 5,953,227 A | * | 9/1999 | March et al. | 700/36 |
| 6,320,272 B1 | * | 11/2001 | Lading et al. | 290/44 |
| 6,512,966 B2 | * | 1/2003 | Lof et al. | 700/291 |
| 6,841,893 B2 | * | 1/2005 | Maiwald et al. | 290/43 |
| 7,013,203 B2 | * | 3/2006 | Moore et al. | 700/286 |
| 2004/0131508 A1 | | 7/2004 | Fairlie et al. | 422/112 |
| 2006/0132993 A1 | * | 6/2006 | Delmerico et al. | 361/20 |
| 2006/0208571 A1 | * | 9/2006 | Fairlie | 307/11 |

FOREIGN PATENT DOCUMENTS

| | | | |
|---|---|---|---|
| DE | 3107078 A1 | * | 9/1982 |
| DE | 3708637 A1 | * | 10/1988 |
| DE | 10055973 A1 | * | 5/2002 |
| GB | 2263734 A | | 8/1993 |
| JP | 2004274981 A | * | 9/2004 |
| JP | 2004355838 A | * | 12/2004 |
| WO | WO 02/084839 A2 | | 10/2002 |
| WO | WO 2004092579 A1 | * | 10/2004 |

* cited by examiner

*Primary Examiner*—Waks Joseph
(74) *Attorney, Agent, or Firm*—Fletcher Yoder

(57) ABSTRACT

A method for controlling variability in power output of a wind farm supplying power to a grid includes monitoring a power output level of the wind farm. The monitored power output level is compared to a target power output level. A command is issued to increase or decrease electrical power consumption by an electrolyzer system electrically coupled to the wind farm to maintain a net power output level by the wind farm based upon the comparison.

21 Claims, 8 Drawing Sheets

SYSTEM AND METHOD FOR CONTROLLING EFFECTIVE WIND FARM POWER OUTPUT

BACKGROUND

The invention relates generally to wind power generation, and more particularly, to techniques for controlling net power output level of a wind farm. Specific embodiments of the present technique facilitate control of the variability in power output levels of a wind farm by associating the power output of the wind farm to a variable electrical load, such as an electrolysis plant.

A wind power generation system generally includes a wind farm having a plurality of wind turbine generators supplying power to a utility grid or other end user. Wind turbine power output is known to experience relatively rapid variations due to changes in wind speed, such as during gusts. Collective power output of the wind farm is greatly influenced by wind conditions on individual wind turbine generators. The inherent inertia of individual wind turbines and the varied operating conditions of wind turbines across a large wind farm may contribute, to an extent, to smoothing of some variation in power output of the wind farm. However, given the changeable nature of winds, it is possible that the collective output of a wind farm can vary from relatively low output levels to full power, and vice versa, in relatively short periods of time. Because electrical power is not stored on the power generation system in any meaningful quantities, it is essential that there always be a balance between electricity generated and electricity consumed.

Utilities often have other power resources, such as thermal power plants to balance their electrical loads, thus accommodating variability in wind conditions during intermittent changes in wind conditions. Thermal power plants may include, for example, coal and gas fired stations. Power fluctuation of wind farms due to gusty or low wind conditions is usually dealt with by adjusting power output of these thermal power plants to provide relatively constant overall power matching demands on a grid system. Such adjustments may, for example, be facilitated by automatic governor response for short time frames, with deliberate dispatch adjustments acting over longer periods.

However, it is often difficult to change power output of thermal power plants instantaneously. Changing of power output may be also referred to as ramping. Thermal power generators desirably require a ramp rate that does not impose excessive thermal stresses, and that accommodates the natural lag times involved in heating and cooling the heat transfer components. As an example, coal-fired power stations may take over 12 hours to start from cold, and, even when hot, may take 2 to 3 hours to be ramped from 0–100% of their rated power. Ramping down of such thermal power generators requires similarly slow rates to minimize risk of damaging plant components. Wind conditions, on the other hand, may change drastically in a relatively shorter time span. It is, therefore, desirable to control power ramp rates of wind farms taking into consideration the maximum prescribed power ramp rates of such other power resources, so as not to require them to respond at higher than acceptable ramp rates.

It is possible to limit power output, and consequently power ramp-up rates of individual wind turbine generators at any level up to a maximum power available given the prevailing wind conditions. This is achieved by curtailing a portion of the power output, so that the power ramp rate does not exceed a maximum desired ramp rate. However this limits the capture of wind energy and increases the effective cost of energy of the wind farm. Similarly, in case of sudden fall in wind speeds, the output of the wind turbine generator may be controlled in a preemptive manner before the wind speed actually starts to fall, so that the power ramp-down rate is gradual and controlled to be within the ramp rate limits of the auxiliary power sources. Although useful as a means of controlling ramp rate, this again restricts power output of the wind turbine generator leading to a loss in wind energy capture.

There is, hence, a need for a technique to control effective power output levels at a wind farm level within limits and ramp rate restrictions prescribed by transmission system operators, while minimizing the loss of useful wind energy, and hence, the effective cost of energy.

BRIEF DESCRIPTION

The present technique accordingly provides a novel system and method to regulate effective power output of a variable power generation system, such as a wind turbine. Briefly, in accordance with one aspect of the present technique, a method for controlling variability in power output of a wind farm supplying power to a grid is provided. The method includes monitoring power output level of the wind farm. The monitored power output levels are compared to a target power output level. A command is issued to increase or decrease electrical power consumption by an electrolyzer system electrically coupled to the wind farm (either locally, or via a grid), to maintain a net power output level by the wind farm based upon the comparison.

In accordance with another aspect, a wind power generation system is provided. The wind power generation system includes a wind farm comprising a plurality of wind turbine generators and an electrolyzer system electrically coupled to the wind farm (either locally, or via a grid). The plurality of wind turbine generators is operable to collectively supply electrical power to a grid. The electrolyzer system is operable to consume variable quantities of power output by the wind farm. The wind power generation system further includes a wind farm management system operable to monitor power output level of the wind farm, compare the monitored power output level of the wind farm to a target power output level, and command an increase or decrease in electrical power consumption by the electrolyzer system to maintain a net power output level by the wind farm based upon the comparison.

In yet another aspect, a method for controlling variability in power output of a renewable energy source supplying power to a grid is provided. The renewable energy source may include, for example, a wind turbine, or a photovoltaic cell, among others. The method includes monitoring power output level of the renewable energy source. The monitored power output levels are compared to a target power output level. A command is issued to increase or decrease electrical power consumption by an electrolyzer system electrically coupled to the renewable energy source, to maintain a net power output level by the renewable energy source based upon the comparison.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique provide a system and method for associating a relatively time insensitive electrical load, such as an electrolysis plant, with a variable power generation system, so as to control the net output of the variable power generation system by controlling the load. In the embodiments illustrated, the variable power generation system includes a wind power generation system. However, other renewable energy generation systems, such as, for example, photovoltaic cells, which are subject to are subject to variability in the energy resource, are also within the scope of the present technique. Specific embodiments of the present technique are discussed below referring generally to FIGS. 1–8.

Figure 1:
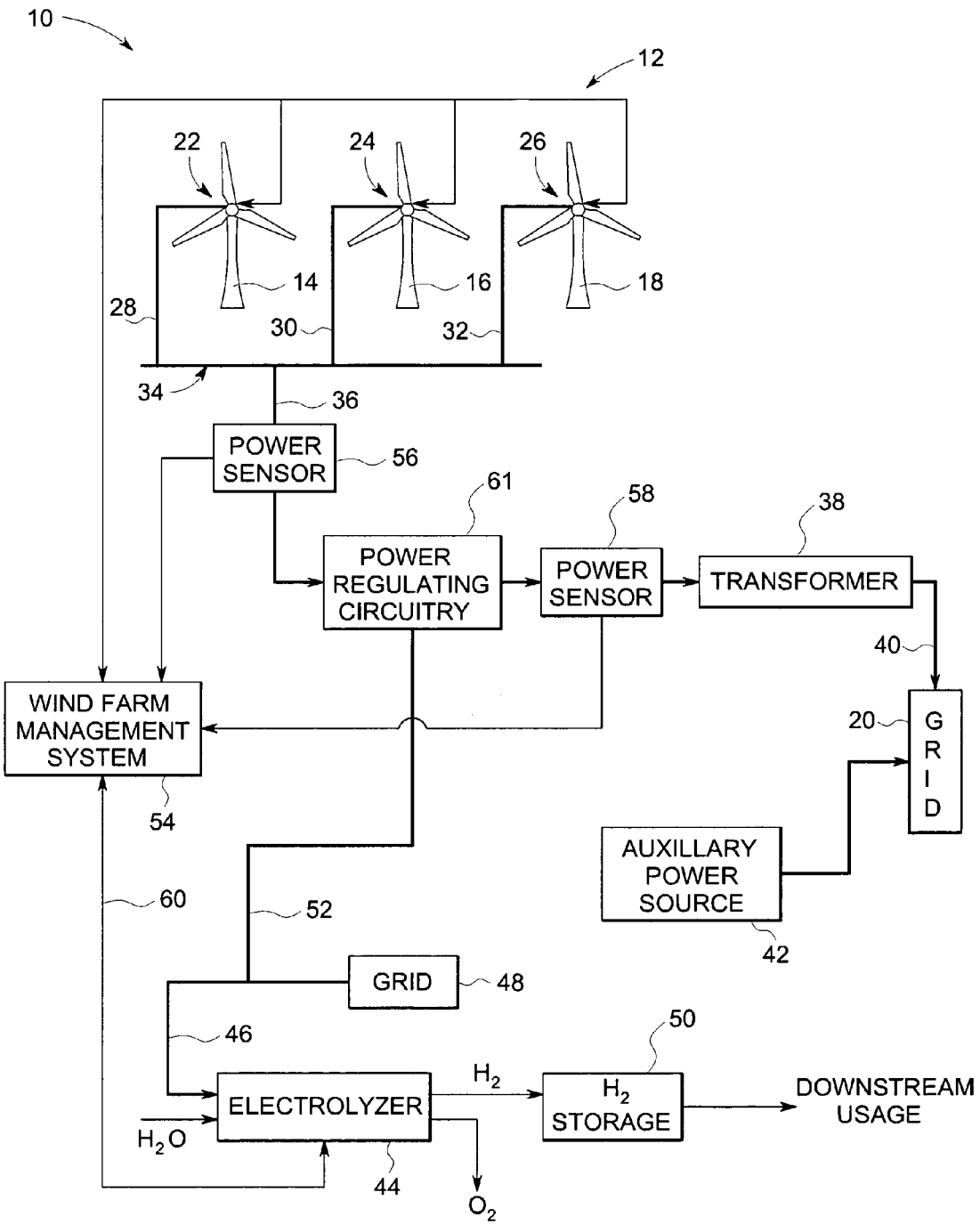
FIG. 1 is a block diagram of a wind power generation system in accordance with aspects of the present technique.

Turning now to the drawings, FIG. 1 is a block diagram of a wind power generation system 10 in accordance with aspects of the present technique. The wind power generation system 10 includes a wind farm 12 having a plurality of wind turbine generators 14, 16, 18 operable to collectively supply electrical power to a grid 20. The wind turbine generators 14, 16, 18 include bladed rotors 22, 24 and 26 that transform the energy of wind into a rotational motion which is utilized to drive electrical generators (not shown) drivingly coupled to these rotors to produce electrical outputs 28, 30 and 32. In the illustrated embodiment, power outputs of individual wind turbine generators are coupled to a medium voltage distribution network 34 to produce a collective wind farm power output 36. The power output may be stepped up in voltage by a transformer 38 before supply to the grid 20. As discussed above, the collective output 36 may vary significantly based on wind conditions on individual wind turbine generators. Embodiments of the present technique function to stabilize the net power output 40 supplied to the grid 20 to a level acceptable by the grid 20, without necessarily curtailing the total output 36 of the wind farm 12. Prescribed power output levels to the grid 20 may be based on power ramp up/ramp-down capabilities of auxiliary power sources 42 conjointly supplying power to the grid. As discussed above, the auxiliary power sources 42 may comprise thermal power plants, such as fossil fuel based plants (e.g. gas or coal-fired power stations), nuclear, or even hydroelectric power stations, for example.

In the illustrated embodiment, the net output 40 to the grid 20 is stabilized by associating the collective power output 36 of the wind farm 12 to a variable electrical load in the form an electrolyzer system 44. As will be appreciated by those skilled in the art, an electrolyzer system is operable to receive electrical power and water ($H_2O$) as input and produce as output hydrogen ($H_2$) and oxygen ($O_2$) based on chemical transformation which may be summarized as below:

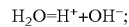

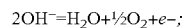

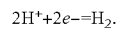

In the illustrated embodiment of FIG. 1, electrical power from the wind farm 12 is coupled to an electrical power input 46 of the electrolyzer system 44. The electrolyzer system 44 may be co-located at the wind farm site but is not necessarily so. The electrolyzer system 44 may be electrically coupled to the wind farm 12 either locally, or via an electrical grid (not specifically shown in FIG. 1). In some applications, the electrolyzer system 44 may not comprise a dedicated unit for the wind farm 12. For example, the electrolyzer system 44 may be used for power storage or delivery purposes other than those related to the specific wind farm 12 and may be employed to service the wind farm 12 as variable wind conditions occur. In such applications, the electrolyzer system 44 may additionally receive power supplied by another source, such as a grid 48. The electrolyzer system 44 in the illustrated embodiment advantageously serves two purposes. First, it serves to produce hydrogen from a renewable energy resource (i.e.—wind in this case). Hydrogen thus produced by wind energy is directed to a hydrogen storage unit 50. The stored hydrogen may be subsequently sold, for example as vehicle fuel, or alternately, may be utilized to drive a gas turbine to augment power output of the wind farm 12. Secondly, the electrolyzer system 44 provides a variable, relatively time insensitive load to ameliorate rapid fluctuations in power output of the wind farm 12. That is, the load represented by the electrolyzer may be brought into play with little delay as compared to the longer delay in adjusting power output of auxiliary power sources running on fossil fuel, to make up for rapid changed in wind farm power output 36. For the wind farm-electrolyzer combination, as described in detail below, the net power output 40 to the grid 42 is equal to the difference between the total collective power output 36 of the wind farm 12 and electrical power 52 consumed by the electrolyzer 44 from the wind farm output.

In one mode of operation, the net power output 40 to the grid 20 may be held substantially constant by modulating the electrolyzer load to follow deviations in the collective wind farm power output 36 from a desired level acceptable to the grid. In another mode of operation the above principle may be extended to control rate-of-change of the net power output 40 to the grid 20 to match or remain within acceptable bounds with respect to a level that is compatible with ramp-up/ramp-down rates of the other power sources (e.g. primary fossil fuel or nuclear facilitates). In a still further mode of operation, by augmenting wind forecasting techniques to the power balancing mechanism provided by the present technique, it is possible to control power ramp-down rate of the wind farm 12 due to a sudden fall in speeds such that net ramp-down rate of the power output 40 supplied to the grid 20 is maintained within a target power ramp-down rate acceptable to the grid 20. Typically such rates are defined by regulations or power supply standards. Successful operation of the wind-farm electrolyzer combination may be achieved by logically associating the individual units, under a real-time control algorithm. Exemplary control algorithms for the above-discussed modes of operation are discussed in greater detail below with reference to FIGS. 3–8.

In the illustrated embodiment, the aforementioned control algorithm is incorporated in a wind farm management system 54 comprising a central controller. In accordance with aspects of the present technique, the controller is operable to modulate the power consumption of the electrolyzer based on instantaneous collective power output 36 of the wind farm 12, and predetermined set points or target values for the net power output 40 to the grid 20, and rate of change of the net power output 40. In certain embodiments, the wind farm management system 54 may be in data communication with individual wind turbine generators of the wind farm 12 and may be operable to control collective power output 36 of the wind farm 12 by controlling power ramp rates of individual wind turbine generators. In the illustrated embodiment, the wind farm management system 54 is operable monitor total power output 36 of the wind farm 12 and the net power 40 transmitted to the grid 20 via power sensors 56 and 58 respectively. Based on the monitored output power level, the wind farm management system is operable to command power consumption 52 by the electrolyzer load so as to maintain the net output 40 within desirable limits. The wind farm management system 54 may communicate load commands to the electrolyzer system 44 via communication links 60. The communication links 60 may include wired or wireless data transfer links including, for example, hardwired cables, private data networks, the Internet, and so forth. In response to these commands, load on the electrolyzer system 44 may be controlled by controlling the current density of current flowing through electrolyzer plates. As will be appreciated by those skilled in the art, controllability of current density may be achieved by controllable power electronic devices, such as rectifiers that convert the AC output of the wind farm into a DC input to the electrolyzer having controlled DC current magnitude. Appropriate sizing of the electrolyzer with respect to the wind generator allows for the benefits of the present technique to be applied on both rising and falling wind power generation. The wind farm management system 54 may further be operable to communicate with power regulation circuitry 61 to distribute power between the grid 20 and the electrolyzer system 44 based on the generated electrolyzer command.

Figure 2:
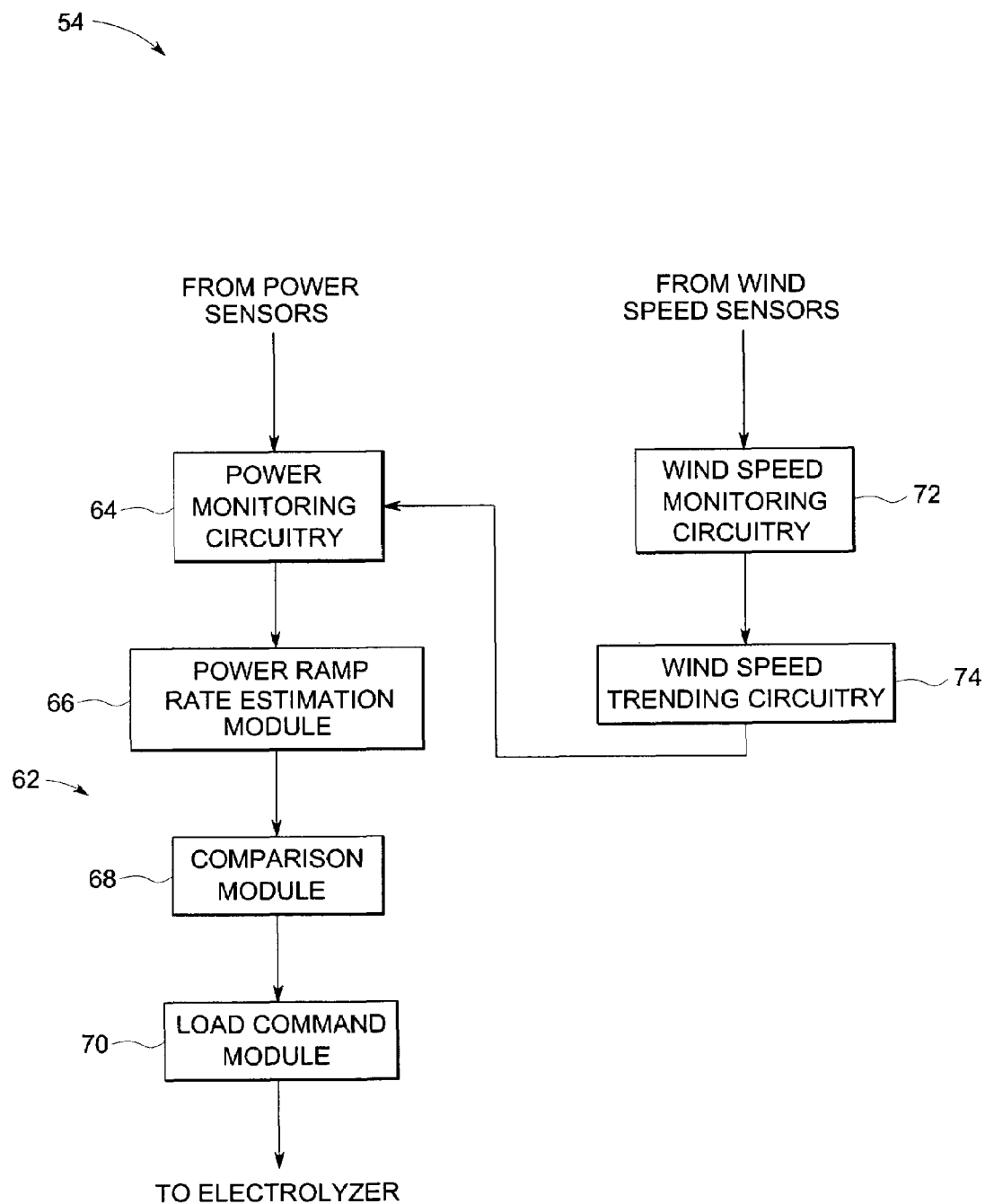
FIG. 2 is a functional block diagram of a wind farm management system according one embodiment of the present technique.

FIG. 2 illustrates a wind farm management system 54, according to aspects of the present technique. As discussed earlier the wind farm management system 54 includes a central controller 62 operable to communicate with power sensors to monitor total wind farm power output 36 and net electrical power 40 supplied to the grid 20. The central controller 62 may include power output monitoring circuitry 64 configured to sample total and net power outputs (36 and 40) at successive points in time, determine temporal averages of power output and identify trends in average total and net power outputs of the wind farm 12. The controller 62 also includes ramp rate estimation circuitry 66, incorporating, for example, algorithms to determine ramp rates of total and net power outputs of the wind farm. The ramp rate estimation circuitry 66 may be likewise configured to determine and sample instantaneous ramp rates of the wind farm, compute temporal averages of power ramp rates and identify trends in the power ramp rate. Trends in power output and ramp rates are utilized by a comparison module 68 to compare these values with desired values acceptable to the grid 20. Based on the comparison, a load command for the electrolyzer is generated by a load command module 70. The load command is transmitted to the electrolyzer via the communication links 60. The wind farm management system 54 may be further operable to monitor wind speeds on individual wind turbine generators. Accordingly the wind farm management system 54 may be in communication with wind speed sensors, and may include wind speed monitoring circuitry 72 to sample sensed wind speeds and determine average temporal wind speeds. The wind farm management system 54 may further include wind speed trending circuitry 74 to identify trends in wind speed. Trending of wind speeds, along with more general and sophisticated meteorological modeling may be advantageously used to forecast rising or falling winds and accordingly preemptively adjust the electrolyzer load such that rate of change of net power output 40 to the grid 20 is within acceptable levels.

Figure 3:
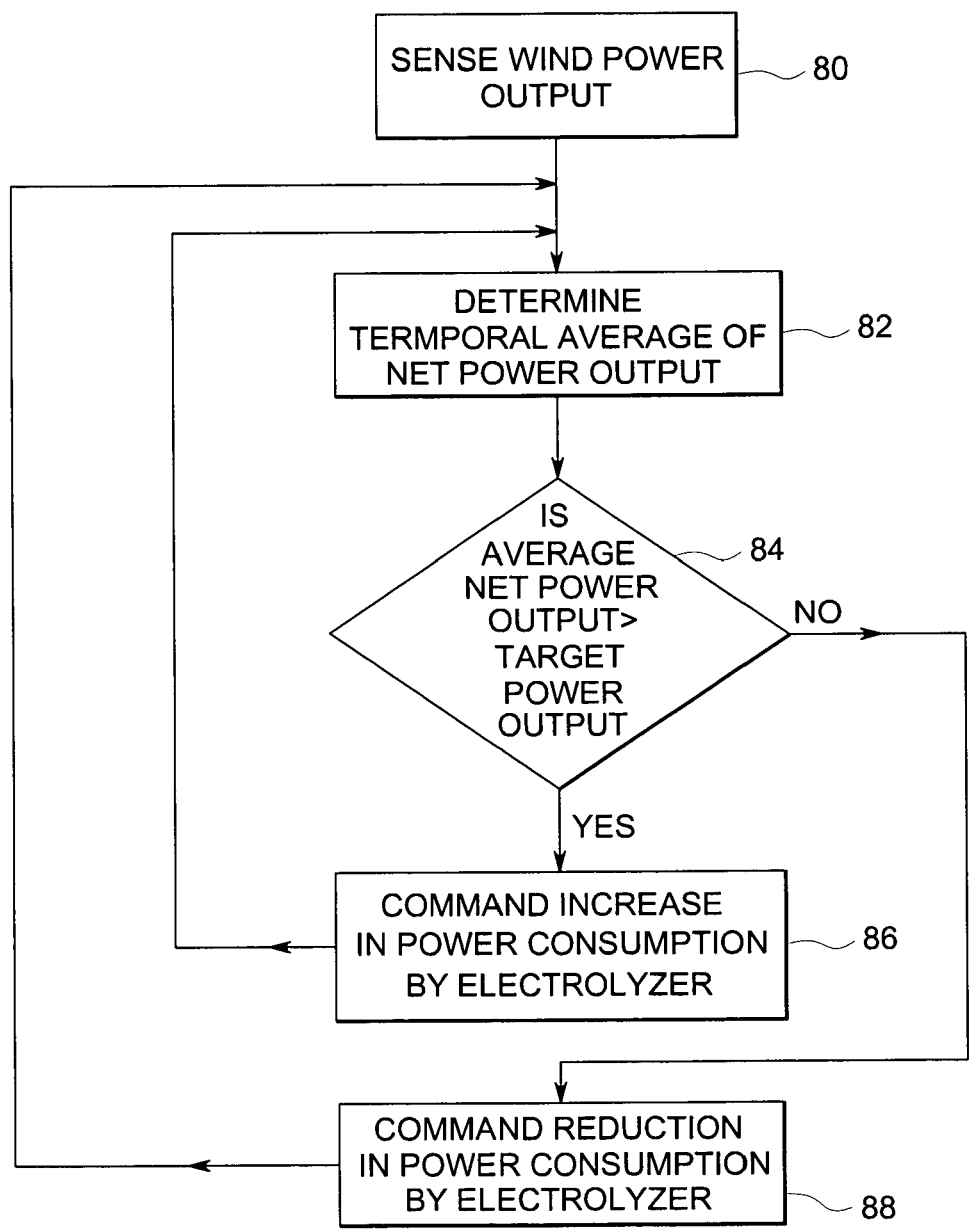
FIG. 3 is a flowchart illustrating a constant power output mode of operation of a wind farm according to one embodiment of the present technique.

FIG. 3 is a flowchart illustrating an exemplary control algorithm to implement a constant net power output mode of operation of the wind farm. The algorithm includes sensing and monitoring wind farm power output (block 80). Next, at block 82, the sensed wind farm power outputs are sampled, and temporal averages are determined for the total wind farm power output 36 and the net power output 40 to the grid 20 as discussed above. At block 84 a check is made if the net power output 40 exceeds a target power output. If it does, an increase in electrolyzer load is commanded (block 86) based on the difference between the net power output 40 and the target power output. Control then passes to block 82. If the net power output 40 is lesser than the target value, a decrease in electrolyzer load may be commanded (block 88) based on the difference between the net power output 40 and the target power output such that the net power to the grid approaches the target value. As can be understood, the above algorithm facilitates a closed loop control mechanism to ensure a relatively flat or constant power output to the grid.

Figure 4:
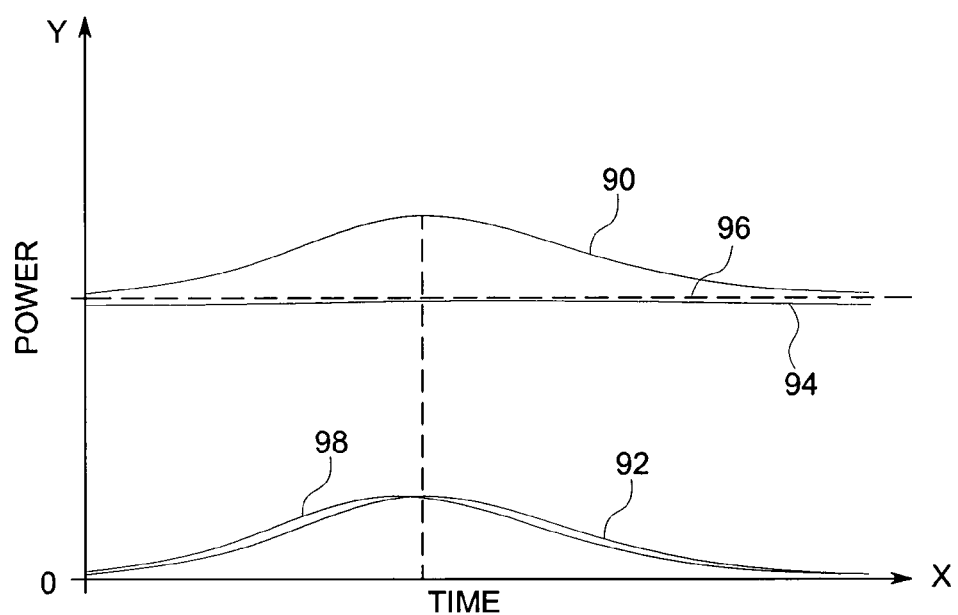
FIG. 4 is a graphical representation of a flat output mode of operation of a wind farm according to one embodiment of the present technique.

The above-described mode of operation is best illustrated via a graphical representation of power output as shown in FIG. 4. FIG. 4 shows a plot of power output (represented along a Y-axis) with time (represented along an X-axis). Trace 90 represents an exemplary variation of total power output 36 (FIG. 1) of the wind farm based on variation in speed. Trace 92 represents a corresponding variation in the electrolyzer load 52 with time. The electrolyzer load is desirably in phase with the wind farm output 36 to produce a relatively flat net power output (represented by trace 94). The technique discussed above ensures that the net output 40 (FIG. 1) does not exceed the target value (represented by dotted trace 96). In certain embodiments, in order to account for a delay between a load command and an actual increase in load, the load command is communicated to the electrolyzer preemptively ahead of time. The above may be achieved by predictively trending wind speeds by the wind farm management system as discussed above. An exemplary variation in load command with time is represented by trace 98. As illustrated in FIG. 4, the load command (trace 98) is suitably configured to be slightly ahead in phase than the resulting electrolyzer load (trace 92) such that the electrolyzer load is substantially in phase with the wind farm power output (trace 90).

Figure 5:
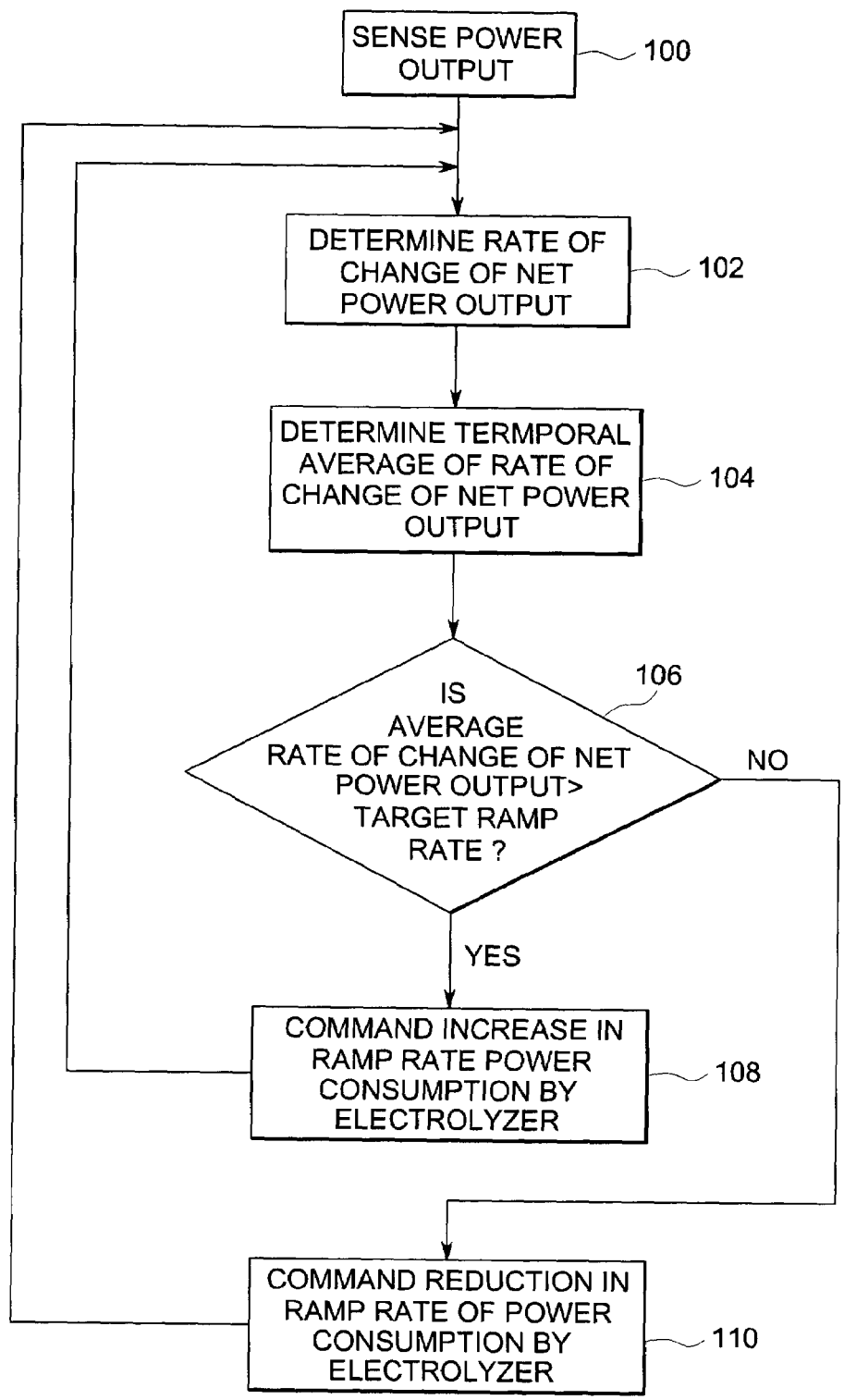
FIG. 5 is a flowchart illustrating a constant ramp rate mode of operation of a wind farm according to one embodiment of the present technique.

FIG. 5 is a flowchart illustrating a control algorithm to maintain rate of the net power output to the grid to within a target ramp rates acceptable to the grid based on ramp-down/ ramp-up capabilities of the auxiliary power sources. As in the above-described mode of operation, wind farm power outputs are first sensed and sampled (block 100). At block 102, instantaneous rate of change of the wind farm power output 36 and the net output 40 to the grid 20 are determined. Instantaneous rate of change may be determined by sampling power output at successive points in time and dividing the difference in power output between adjacent points in time by the time by the sampling time interval. At block 104, a temporal average is determined for the rates of change of wind farm power output 36 and the net power output 40 to the grid 20. The temporal average may include, for example, a rolling average of rates of change determined for a moving time-window. At block 106 a comparison is made to determine if the rate of change of net power output 40 is greater than the target ramp rate. If so, then an increase in power consumption by the electrolyzer is commanded, based on a difference between the rate of change of net power output 40 and the target ramp rate, such as to increase rate of change of power consumption by the electrolyzer (block 108). Block 108 therefore facilitates maintaining the rate of change of net power output below the target ramp rate, as the rate of change of net power output is mathematically equal to the difference between the rate of change of total wind farm power output 36 and the rate of change of power consumption 52 by the electrolyzer. Control subsequently returns to block 82. If at block 106, the rate of change of net power output 40 is less than the target ramp-up rate, a decrease in power consumption by the electrolyzer may be commanded (block 110), such that the rate of change of net power output to the grid approaches the target ramp rate. In practice, the ramp rates be defined as "not to exceed" rates, or may carry some practical range or bound, upper, lower, or both.

Figure 6:
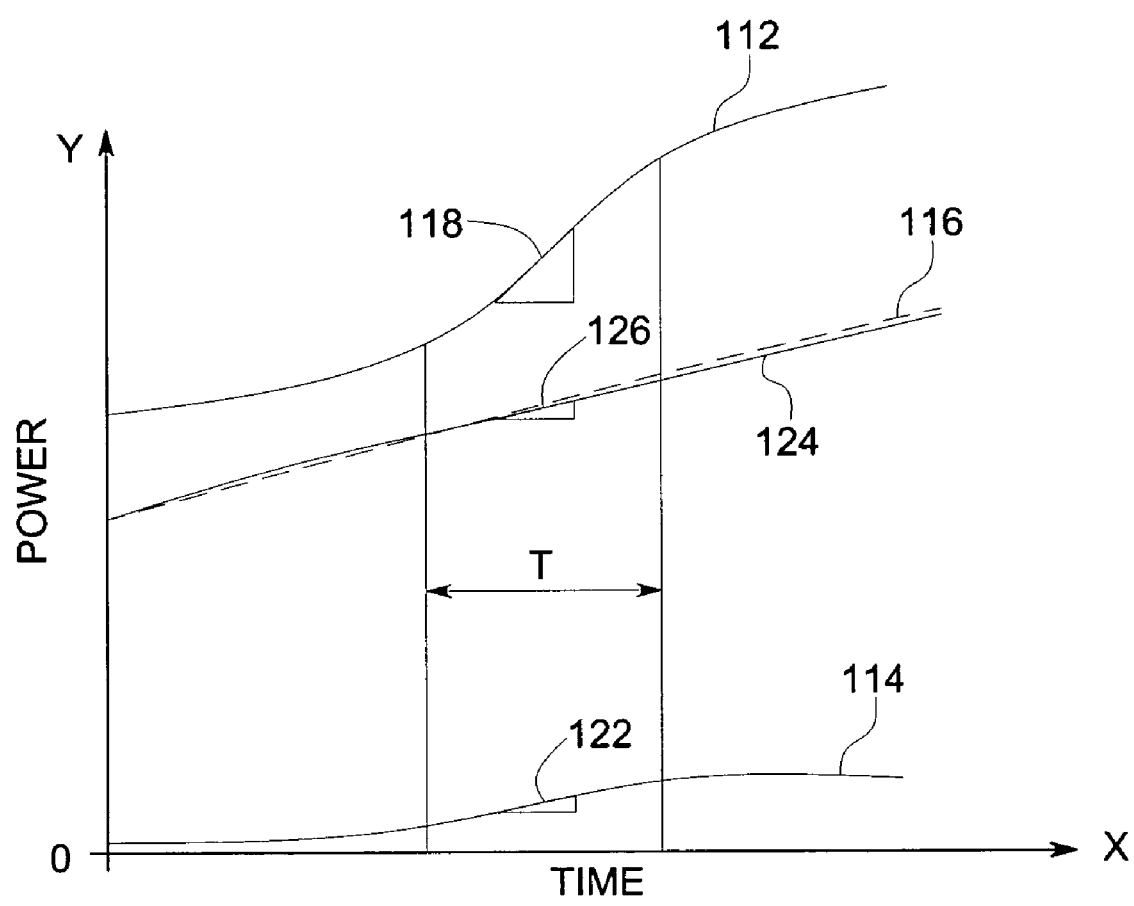
FIG. 6 is a graphical representation of a constant ramp rate mode of operation of a wind farm according to one embodiment of the present technique.

The above-described mode of operation is illustrated via a graphical representation of power output as shown in FIG. 6. FIG. 6 shows a plot of power output (represented along a Y-axis) with time (represented along an X-axis). Trace 112 represents an exemplary ramp up of total power output of the wind farm based on rising wind speeds. Trace 114 represents a corresponding variation in the electrolyzer load with time. Unlike in the earlier embodiment, the target power level in this case is not a flat trace, but a ramp as illustrated by dotted trace 116. As can be seen, in the time interval designated by T, the rate of change of net power output (represented by slope 118) is greater than the target ramp rate (represented by the slope of the trace 116). Therefore during the time window T, the actual load on the electrolyzer (represented by trace 120) is ramped at a faster rate than before. This is represented by an increase in slope (represented by 122) of the trace 122 in the interval T. The resulting net grid power output is represented by trace 124. As illustrated, due to increased ramp rate of electrolyzer load with increasing wind farm power ramp rate, the rate of change of net power output 40 (represented by slope 126) is maintained below the target ramp rate (slope of the trace 116).

Figure 7:
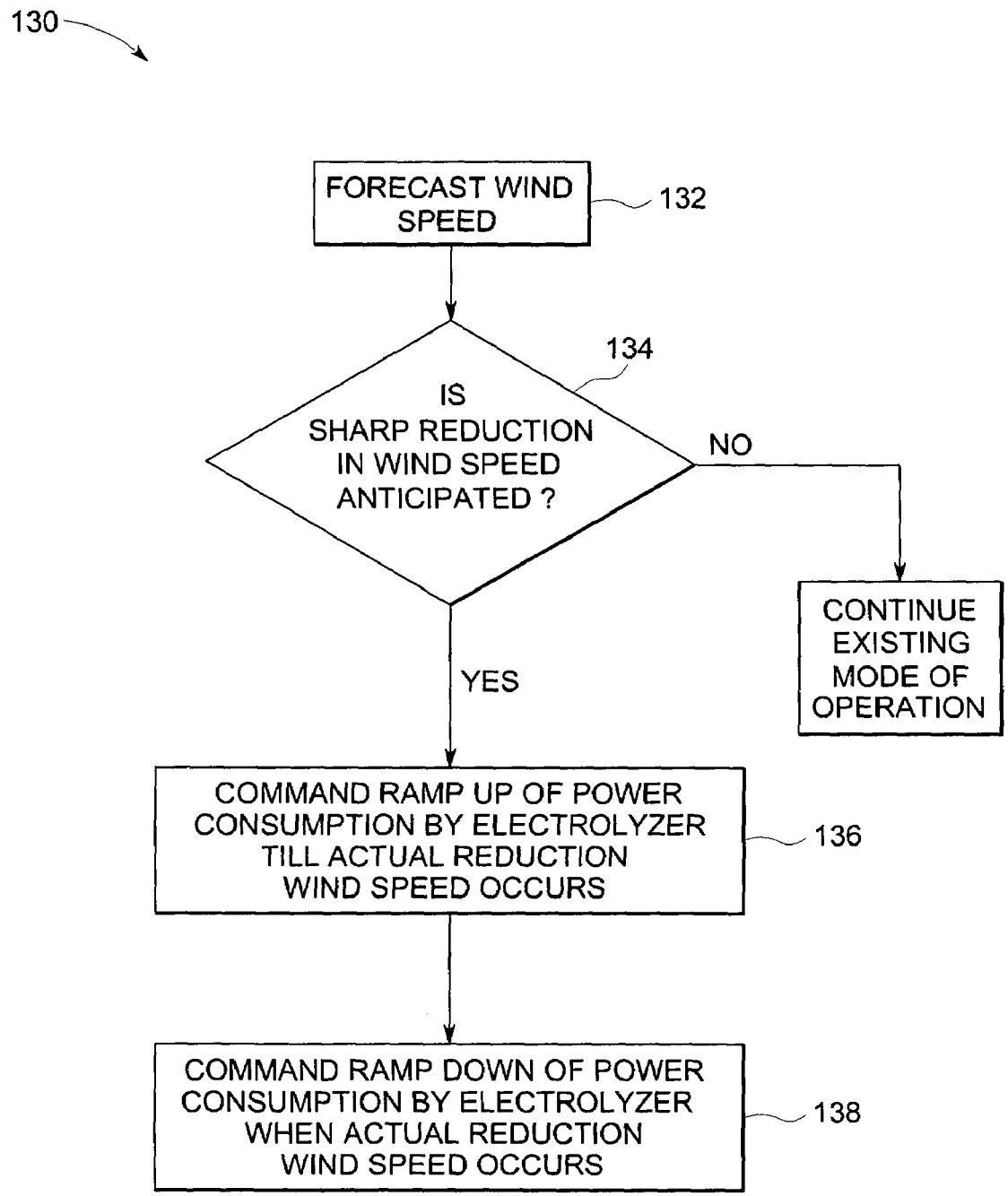
FIG. 7 is a flowchart illustrating a method to control ramp-down rate of net power output of a wind farm during sudden fall in wind speed according to aspects of the present technique.

Aspects of the present technique may also be incorporated to provide a method to control ramp-down rate of net grid power output due to a sudden fall in wind speed. FIG. 7 is a flowchart illustrating an exemplary method 130 to accomplish the above. The method 130 includes forecasting wind speeds (block 132) to anticipate sharp decline in wind speeds. Block 132 may include, for example, sensing and trending wind speeds at individual wind turbine generators as discussed above. At block 134 a check is made to determine if a sharp reduction in wind speed is likely ahead of a predetermined interval of time. According to the illustrated embodiment of the present technique, in response to an anticipated decline in wind speed, instead of reducing the wind output some time, the electrolyzer power consumption 52 is ramped up at a controlled rate, such that the net grid power output 40 falls at a desirably slow rate (block 126). When the wind power actually begins to drop, and drop quickly, a decrease in electrolyzer load is commanded (block 138) utilizing the controllability of the electrolyzer to ensure that the net grid power output 40 does not decline faster than a target power ramp-down rate. In this mode of operation, the electrolyzer load effectively "cushions" drops in wind power output to enable the target ramp rate to be respected. It may be noted that a similar control may be implemented for ramping up net wind farm power output.

Figure 8:
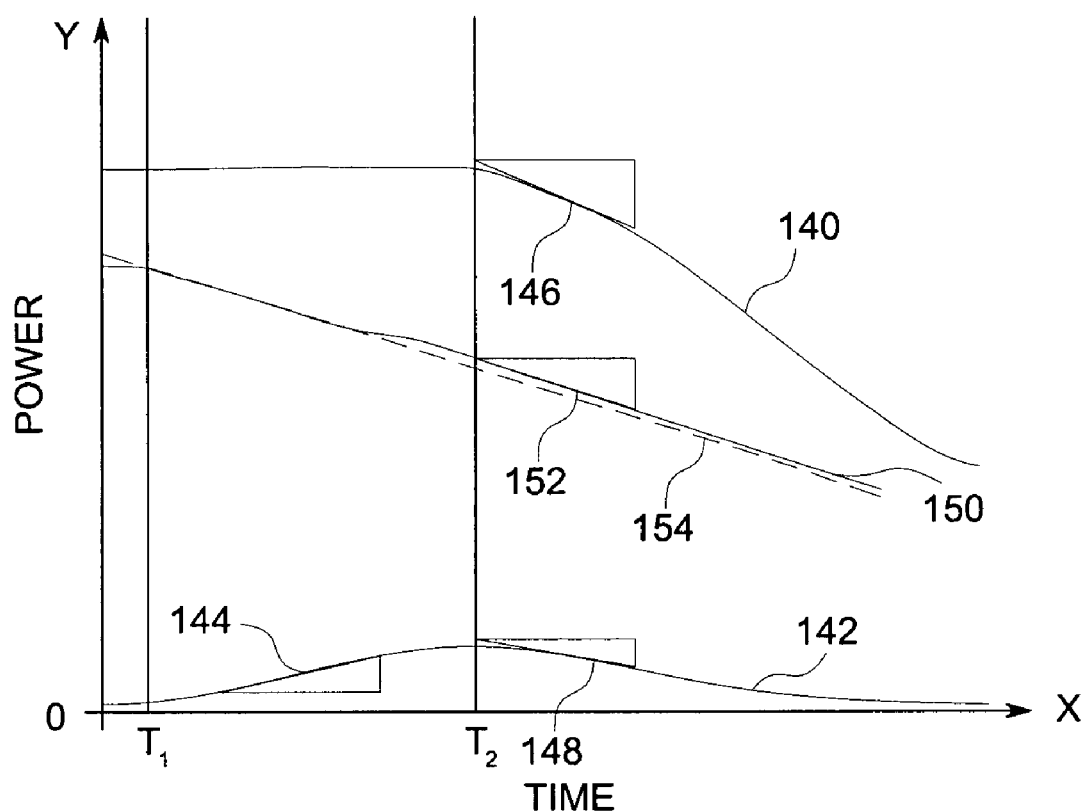
FIG. 8 is a graphical illustration of control of net power ramp-down rate of a wind farm during sudden fall in wind speed according to aspects of the present technique.

FIG. 8 shows a plot of power output (represented along a Y-axis) with time (represented along an X-axis) illustrating the above-described mode of operation. Trace 140 represents an exemplary reduction of total power output 36 of the wind farm based sharp decline in wind speeds. Trace 142 represents a corresponding variation in the electrolyzer load with time. The time at which a forecast for sharp decline in wind speed is designated by $T_1$, and the time at which actual reduction in wind speed occurs is designated by $T_2$. As illustrated, in response to a forested decline in wind speed, the electrolyzer load is ramped up at a controlled rate (represented by slope 144), till time $T_2$, when an actual reduction in wind speed occurs. Once the wind speed drops, wind farm power output 36 also reduces, as illustrated by a negative slope 146. However, after time $T_2$, the electrolyzer load consumption is reduced as indicated by a negative slope 148. The resulting net grid power output illustrated by trace 150 therefore drops at a rate (represented by a negative slope 152) that does not exceed a target power ramp-down rate acceptable to the grid, represented by the slope the dotted trace 154. The above-described technique thus advantageously offsets a rapidly declined wind farm output with a slightly less rapidly declining electrolyzer demand to end up with a slowly declining net grid power output that is within the ramp rate limitations of the thermal plants.

The techniques discussed above thus advantageously facilitate regulation of net electrical power output of a variable power generation system without curtailing power output of the system. Although the present technique has been embodied on a wind power generation system, it should be appreciated that use of a variable electrolyzer load may be incorporated to stabilize power output of other renewable energy sources, such as, for example, photovoltaic cells. Embodiments of the present techniques further facilitate observance of grid power ramp rate limits without loss of effective wind energy capture. The illustrated embodiments thus facilitate a higher penetration of wind power on to electricity networks.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling variability in power output of a wind farm supplying power to a grid, comprising:
 monitoring a power output level of the wind farm;
 comparing the monitored power output level of the wind farm to a target power output level;
 commanding an increase or decrease of electrical power consumption by an electrolyzer system electrically coupled to the wind farm to maintain a net power output level by the wind farm based upon the comparison; and monitoring a rate of change of power output by the wind farm and comparing the rate of change to a target rate of change of power output supplied to the grid.

2. The method of claim 1, comprising increasing electrical power consumption by the electrolyzer system in response to an increase in the power output level of the wind farm and decreasing electrical power consumption by the electrolyzer system in response to a decrease in the power output level of the wind farm to maintain the net power output level by the wind farm to the grid relatively constant.

3. The method of claim 1, wherein the target rate of change of power output supplied to the grid is based on allowable power ramp rates of one or more auxiliary power sources supplying power to the grid.

4. The method of claim 1, wherein the electrolyzer system power consumption is commanded based upon the difference between total power output of the wind farm and a target power output supplied to the grid.

5. The method of claim 1, further comprising storing hydrogen produced by the electrolyzer system in response to a command to increase power consumption by the electrolyzer system.

6. The method of claim 5, further comprising recycling the stored hydrogen to generate electrical power to augment electrical power produced by the wind farm.

7. A method for controlling a rate of change of net power output of a wind farm, comprising:
monitoring a rate of change of power output of the wind farm;
comparing the monitored rate of change of power output of the wind farm to a target rate of change of power output; and
commanding an increase or decrease of electrical power consumption by a electrolyzer system electrically coupled to the wind farm, wherein the electrolyzer system power consumption is commanded based upon the difference between the rate of change of total power output of the wind farm and the target rate of change of power output being supplied to a grid.

8. The method of claim 7, wherein the target power ramp rate is based on allowable ramp up and ramp-down rates of auxiliary power sources supplying power to the grid.

9. A method for controlling a ramp-down rate of net power output of a wind farm, comprising:
forecasting a reduction in power output of the wind farm due to reduced wind speeds based on a rate of change of power output of the wind farm;
ramping up electrical power consumption of an electrolyzer system electrically coupled to the wind farm in response to the forecast until an actual reduction in power output of the wind farm occurs; and
ramping down electrical power consumption of the electrolyzer system in response to the actual reduction of power output of the wind farm to maintain the ramp-down rate of net power output of the wind farm within a target ramp-down rate.

10. The method of claim 9, wherein forecasting the reduction in power output of the wind farm comprises: sensing and trending wind speeds at individual wind turbine generators.

11. A wind power generation system, comprising:
a wind farm comprising a plurality of wind turbine generators operable to collectively supply electrical power to a grid;

an electrolyzer system electrically coupled to the wind farm and operable to consume variable quantities of power output by the wind farm; and
a wind farm management system operable to monitor a power output level of the wind farm, compare the monitored power output level of the wind farm to a target power output level, command an increase or decrease in electrical power consumption by the electrolyzer system to maintain a net power output level by the wind farm based upon the comparison, and monitor a rate of change of power output by the wind farm and compare the rate of chance to a target rate of change of power output supplied to the grid.

12. The wind power generation system of claim 11, wherein the wind farm management system further comprises:
power monitoring circuitry configured to determine temporally averaged power output and ramp rates of the wind farm;
a comparison module configured to compare the temporally averaged power output and ramp rates with a target power output and ramp rate; and
a load command module configured to generate an electrolyzer load command based on the comparison.

13. The wind power generation system of claim 11, wherein the wind farm management system is operable to communicate with the electrolyzer system via a hard wired cable, or Internet, or a private network, or combinations thereof.

14. A method for controlling variability in power output of a renewable energy source supplying power to a grid, comprising:
monitoring a power output level of the renewable energy source and monitoring a rate of change of power output of the renewable energy source;
comparing the monitored power output level of the renewable energy source to a target power output level; and
commanding an increase or decrease of electrical power consumption by an electrolyzer system electrically coupled to the renewable energy source to maintain a net power output level by the renewable energy source based upon the comparison.

15. The method of claim 14, wherein the renewable energy source comprises a wind turbine.

16. The method of claim 14, wherein the renewable energy source comprises a photovoltaic cell.

17. The method of claim 14, further comprising storing hydrogen produced by the electrolyzer system in response to a command to increase power consumption by the electrolyzer system.

18. The method of claim 17, further comprising recycling the stored hydrogen to generate electrical power to augment electrical power produced by the renewable energy source.

19. A method for controlling variability in power output of a wind farm supplying power to a grid, comprising:
monitoring a power output level of the wind farm;
comparing the monitored power output level of the wind farm to a target power output level;
commanding an increase or decrease of electrical power consumption by an electrolyzer system electrically coupled to the wind farm to maintain a net power output level by the wind farm based upon the comparison; and
monitoring a rate of change of power output by the wind farm and comparing the rate of change to a target rate of change of power output supplied to the grid, wherein the target rate of change of power output supplied to the grid is based on allowable power ramp rates of one or more auxiliary power sources supplying power to the grid.

20. A method for controlling variability in power output of a wind farm supplying power to a grid, comprising:

monitoring a power output level of the wind farm;

comparing the monitored power output level of the wind farm to a target power output level;

commanding an increase or decrease of electrical power consumption by an electrolyzer system electrically coupled to the wind farm to maintain a net power output level by the wind farm based upon the comparison; and monitoring a rate of change of power output by the wind farm and comparing the rate of change to a target rate of change of power output supplied to the grid, wherein the electrolyzer system power consumption is commanded based upon the difference between a rate of change of total power output of the wind farm and the target rate of change of power output supplied to the grid.

21. A method for controlling variability in power output of a wind farm supplying power to a grid, comprising:

monitoring a power output level of the wind farm;

comparing the monitored power output level of the wind farm to a target power output level;

commanding an increase or decrease of electrical power consumption by an electrolyzer system electrically coupled to the wind farm to maintain a net power output level by the wind farm based upon the comparison; and monitoring a rate of change of power output by the wind farm and comparing the rate of change to a target rate of change of power output supplied to the grid, wherein monitoring the power output level of the wind farm further comprises:

sensing the power output level of the wind farm at successive points in time; and determining a temporal average of sensed power output levels of the wind farm for a selected time window.

* * * * *